US006326627B1

(12) United States Patent
Putvinski et al.

(10) Patent No.: US 6,326,627 B1
(45) Date of Patent: Dec. 4, 2001

(54) MASS FILTERING SPUTTERED ION SOURCE

(75) Inventors: Sergei Putvinski, La Jolla, CA (US); Vadim Volosov, Novosibirsk (RU)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/630,847

(22) Filed: Aug. 2, 2000

(51) Int. Cl.[7] ............................ G21K 1/08; B01D 35/06; B01D 17/06; B03D 3/06

(52) U.S. Cl. .................................. 250/423 R; 250/396 R; 250/492.3; 250/281; 210/695; 204/554; 209/121

(58) Field of Search ........................ 250/396 R, 396 ML, 250/298, 294, 281, 423 R; 210/695; 204/554; 209/121

(56) References Cited

U.S. PATENT DOCUMENTS 3,722,677 3/1973 Lehnert .
4,431,901 2/1984 Hull .
5,039,312 8/1991 Hollis, Jr. .
5,350,454 9/1994 Ohkawa .
5,578,130 * 11/1996 Hayashi et al. .................. 118/723 E
5,681,424 10/1997 Eastlund .
6,096,220 8/2000 Ohkawa .
6,251,281 * 6/2001 Ohkawa ............................... 210/695
6,251,282 * 6/2001 Putvinski et al. .................... 210/695

* cited by examiner

*Primary Examiner*—Teresa M. Arroyo
*Assistant Examiner*—Kalimah Fernandez
(74) *Attorney, Agent, or Firm*—Nydegger & Associates

(57) ABSTRACT

A device and method for separating ions uses electric and magnetic fields that are specifically configured and oriented in a vacuum chamber. Also, a central electrode that is made of the materials whose ions are to be separated is positioned in the chamber. Magnetic coils mounted on the chamber generate a magnetic field, B, that is oriented parallel to the central electrode and is configured with a disk-shaped magnetic mirror at one end of the chamber, and an annular-shaped magnetic mirror at the other end. A plurality of electrodes generate an electric field, E, that is oriented perpendicular to the central electrode. In operation, neutral atoms in the chamber are ionized by the electric field. The electric field, however, is specifically configured to confine relatively lighter mass ions in the chamber. These ions are then subsequently removed from the chamber through the opening in the annular-shaped magnetic mirror. Simultaneously, the electric field directs the heavier mass ions into contact with the central electrode, to thereby sputter the electrode and generate additional neutral atoms for ionization in a sustained operation.

20 Claims, 2 Drawing Sheets

MASS FILTERING SPUTTERED ION SOURCE

FIELD OF THE INVENTION

The present invention pertains generally to devices and methods for generating ions and for separating ions of different mass charge ratios from each other. More particularly, the present invention pertains to devices and methods that are capable of effectively separating ions of different mass charge ratios after the ions have been generated by plasma sputtering. The present invention is particularly, but not exclusively, useful as a device and method for plasma sputtering a multi-metallic substrate, wherein previously-sputtered heavier ions are redirected into contact with the substrate for additional sputtering, and previously-sputtered lighter ions are prevented from doing so and, instead, are separately collected.

BACKGROUND OF THE INVENTION

For applications wherein the purpose is to separate a constituent element from a chemical compound, from a metallic alloy or from some other mixture of elements, there are several possible ways to proceed. In some instances, mechanical separation may be possible. In others, chemical separation may be more appropriate. Further, when mechanical or chemical processes are not feasible, it may happen that procedures and processes involving plasma physics may be necessary. If so, it is necessary to first generate a multi-species plasma that contains the target constituent. Then, it is necessary to separate the target constituent from the rest of the multi-species plasma.

There are many known ways in the pertinent art by which plasmas, including multi-species plasmas, can be generated. For example, the evaporation of a substrate by an electron beam or by laser ablation is often used in plasma processing applications. Another method involves sputtering. With sputtering, atoms are removed from an electrode by positive ion bombardment of a source material. Insofar as sputtering is concerned, a relatively recent development in this field is provided in an article entitled "Universal Metal Ion Source" authored by Churkin et al. of the Budker Institute of Nuclear Physics, Novosibirsk Russia, and presented in the American Institute of Physics, 1998. In particular, this article discloses an electrode that is used as a metal ion source and sputtered in a magnetic trap. As disclosed in the Churkin article, this is done with crossed electrical and magnetic fields.

As implied above, once the multi-species plasma has been generated, it is still necessary to separate the target constituent from the plasma. Again, such a separation can be accomplished in several ways known in the pertinent art. For example, plasma centrifuges and their methods of operation are well known. On the other hand, and not yet so well known, plasma filters and their methods of operation are also useful for this purposes. For example, the invention as disclosed by Ohkawa in U.S. application Ser. No. 09/192,945, filed on Nov. 16, 1998, for an invention entitled "Plasma Mass Filter" and assigned to the same assignee as the present invention is useful for separating ions of different mass charge ratios. Due to the fact that the phenomena involved with plasma filter procedures are quite different from those involved with a plasma centrifuge, it is helpful to mathematically consider these phenomena as they will apply to the situation wherein a multi-species plasma is generated using a sputtered ion source.

In a vacuum chamber, when an inwardly oriented, radial electric field (E) is crossed with an axial magnetic field (B), charged particles will have orbits that are described by the following equation:

$$md^2r/dt^2=eE+e[VB]$$

In the equation above, "m" is the mass of the charged particle (e.g. ion), "e" is the ion charge, and "V" is particle velocity. For a conservation of energy, it can be shown from the above equation that:

$$m(V_r^2+V_\theta^2+V_z^2)/2+e\phi+(r)=\epsilon$$

$$mV_\theta r+eBr^2/2=M$$

where "θ" is electrode potential, "ε" is the total energy of a particle, "M" is the angular momentum of the particle, "$V_r$" is the radial component of particle velocity, "$V_\theta$" is the angular component of particle velocity, and "$V_z$" is the axial component of particle velocity.

In a cylindrical-shaped vacuum chamber, immediately after a charged particle has been ionized at a distance $r_{max}$ from the central axis, it will have a very small kinetic energy and the total energy ε will be:

$$\epsilon=e\phi(r_{max})$$

and its angular momentum will be:

$$M=eB(r_{max})^2/2$$

Once ionized, the particle will then be influenced by the radial electric field (E) in the chamber that will accelerate it toward the axis. Acting against this acceleration of the charged particle toward the axis will be a Lorentz force that deflects the charged particle away from the axis and back to its original distance from the axis, i.e. $r_{max}$. At the point when the charged particle (ion) is closest to the axis, i.e. at $r_{min}$, its radial velocity will be equal to zero ($V_r$=0). For this condition:

$$U=\phi(r_{max})-\phi(r_{min})=(eB((r_{max})^2-(r_{min})^2/r_{min})^2/8m$$

At this point, consider that the electric field (E) is, at least in part, generated by a central electrode that is oriented along the central axis. Further, consider that the central electrode is generally rod-shaped and has a radius that is equal to "a" (i.e. $r_{min}$=a). Thus, if $r_{min}$ is less than "a" (i.e. $r_{min}$<a), when the charged particle is accelerated toward the electrode it will be lost to the electrode.

If, as indicated, the above-described conditions are established in a generally cylindrical shaped chamber that has a wall at a radius "b" from the central axis, there is a critical electrical potential in the chamber that can be expressed as:

$$U(r)=e^2B^2(r^2-a^2)^2/8a^2m=U_o(r^2-a^2)^2/(b^2-a^2)^2 \quad \text{(Eq. 1)}$$

The total voltage applied between the central electrode and the wall of the chamber can then be expressed as:

$$U_o=e^2B^2(b^2-a^2)^2/8a^2m$$

The consequence of all this is that when $U_o$ is established inside the chamber with radial profile U(r), described by Eq. 1, ions with a mass greater than "m" (i.e. $m_2$>m) will fall onto the central electrode. On the other hand, ions with a mass less than "m" (i.e. $m_1$<m) will not fall onto the central electrode but, instead, will be confined inside the chamber for subsequent separation from the plasma.

In light of the above, it is an object of the present invention to provide a device for separating ions from each other which uses relatively heavier mass ions in a multi-species plasma to sputter a metallic electrode and, thereby, generate more of the multi-species plasma. Another object of the present invention is to provide a device for separating ions from each other that effectively confines relatively lighter mass ions to a predetermined volume in a chamber for subsequent removal therefrom. Yet another object of the present invention is to provide a device for separating ions from each other that is effective for separating metal ions from a metal alloy. Still another object of the present invention is to provide a device for separating ions from each other that is easy to use, relatively simple to manufacture and comparatively cost effective.

SUMMARY OF THE PREFERRED EMBODIMENTS

A device for separating ions of different mass charge ratios from each other includes an elongated chamber that defines a longitudinally aligned central axis and has a first end and a second end. In its configuration, the elongated chamber is preferably cylindrical shaped and has a wall that is positioned at a distance "b" from the central axis. A central electrode is positioned in the chamber and is aligned along the axis. Preferably, the electrode is rod-shaped, has a radius "a," and is made of at least two elements. For example, one of the elements is preferably a light metal that has a mass "$m_1$." The other element is relatively heavy, such as a heavy impurity, and it has a mass "$m_2$."

An axially oriented magnetic field, B, is generated in the chamber by magnetic coils that are specifically configured to create so-called "magnetic mirrors" at the opposite ends of the chamber. More specifically, the magnetic mirror at one end of the chamber exists over the full plasma cross section. At the opposite end of the chamber, however, the magnetic mirror exists only at the plasma periphery and thus, an annular-shaped mirror establishes an effective exit opening near the axis of the chamber.

In addition to the magnetic field, B, a radially oriented electric field, E, is also generated inside the chamber. Accordingly, there are crossed electric and magnetic fields (E×B) in the chamber that will exert forces on charged particles in a predictable manner. The consequence of these forces for a charged particle (ion) having a mass, m, will depend on the particular configurations of both the electric field, E, and the magnetic field, B. Recall, the configuration of the magnetic field, B, requires the establishment of magnetic mirrors at opposite ends of the chamber. To interact with this particular magnetic field configuration, the present invention requires that the electric field, E, be configured with a critical electric potential $U_o=e^2B^2(b^2-a^2)^2/8a^2m$, wherein "e" is the ion charge. This critical potential is established between the central electrode and the wall of the chamber. Additional electrodes, positioned at the ends of the chamber, can be used together with the central electrode to control the electric field radial profile.

In operation, the magnetic coils are activated to create a steady state magnetic field (B) in the substantially cylindrical-shaped chamber. As indicated above, a full magnetic mirror is created at one end of the chamber and an annular-shaped magnetic mirror is created at the other end. The chamber is then initially pre-filled with a gas such as Hydrogen ($H_2$) or Argon (Ar). The initial gas pressure in the chamber will be established at approximately $10^{-4}$ Torr. Next, a voltage, in the range of about one to three thousand electron volts ($U\approx 1-3$ keV), is applied to interact with gas in the chamber and, thereby, generate a plasma discharge. Positive ions from this plasma discharge are then accelerated by the electric field, E, toward the central electrode. Collisions between the ions and the central electrode cause metal ions and neutral atoms to sputter from the central electrode. In turn, the sputtered neutral atoms are ionized by the electric field (E). Thus, the process is continued in a sustained operation as some of these new ions are accelerated back toward the electrode for subsequent sputtering. As caused by the present invention, it will happen that some of the newly ionized charged particles will have insufficient mass to be accelerated into collision with the electrode.

Due to the establishment of a critical electric potential $U_o=e^2B^2(b^2-a^2)^2/8a^2m$ in the chamber (recall "e" is the ion charge, "m" is the ion mass, "b" is the radius of the chamber, and "a" is the radius of the central electrode), the ions will react to $U_o$ differently, according to their mass. Specifically, when $U_o$ is established inside the chamber, ions with a mass greater than "m" (i.e. $m_2>m$) will fall onto the central electrode. Thus, it is the relatively heavier ions that will continue sputtering the electrode to sustain the generation of a plasma in the chamber. On the other hand, ions with a mass less than "m" (i.e. $m_1<m$) will not fall onto the central electrode. Instead, these lighter ions will be confined inside the chamber for subsequent removal from the plasma. Specifically, the removal of the lighter ions will be accomplished through the exit opening of the annular-shaped magnetic mirror.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
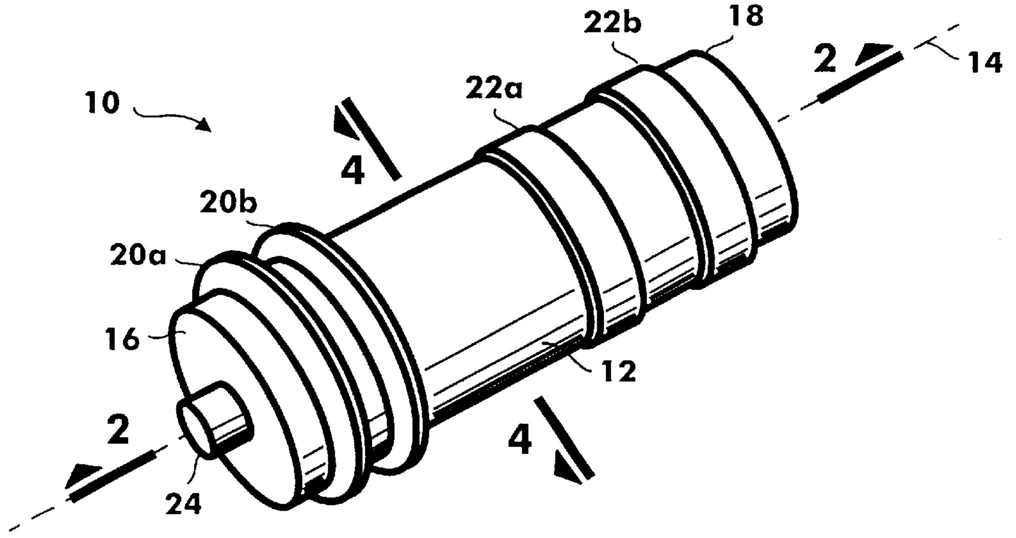
FIG. 1 is a perspective view of a vacuum chamber for use with the present invention.

Referring initially to FIG. 1, a device for separating ions in accordance with the present invention is shown and generally designated 10. As shown, the device 10 includes a substantially cylindrical-shaped chamber 12 that defines a longitudinal axis 14, and has a first end 16 and a second end 18.

Magnetic coils 20*a* and 20*b* are shown mounted on the chamber 12 at its first end 16, and magnetic coils 22*a* and 22*b* are shown mounted on the chamber 12 at its second end 18. Together, these magnetic coils 20*a,b* and 22*a,b* create a magnetic field (B) inside the chamber 12. The particular magnetic coils 20*a,b* and 22*a,b* that are shown in the Figures are, however, only exemplary and additional magnetic coils can be incorporated as desired. The magnetic coils 20*a,b,* and 22*a,b* are, however, shown in the Figures to illustrate that the magnetic field (B) will be strongest at the ends 16 and 18. Also, they are configured to illustrate that the coils 20*a* and 20*b* at the first end 16 are to be positioned at a greater distance from the axis 14 than are the magnetic coils 22*a* and 22*b* at the second end 18. The consequence of all this is that the magnetic field (B) will generate so-called "magnetic mirrors" at both the first end 16 and at the second end 18. Thus, in comparison with each other, there will be a full magnetic mirror across the whole cross section at the second end 18 ($r<b$), and a generally annular-shaped magnetic mirror at the first end 16 ($c<r<b$). The exit 24 shown in FIGS. 1 and 2 is specifically positioned around the center of the annular-shaped mirror at the first end 16.

Figure 2:
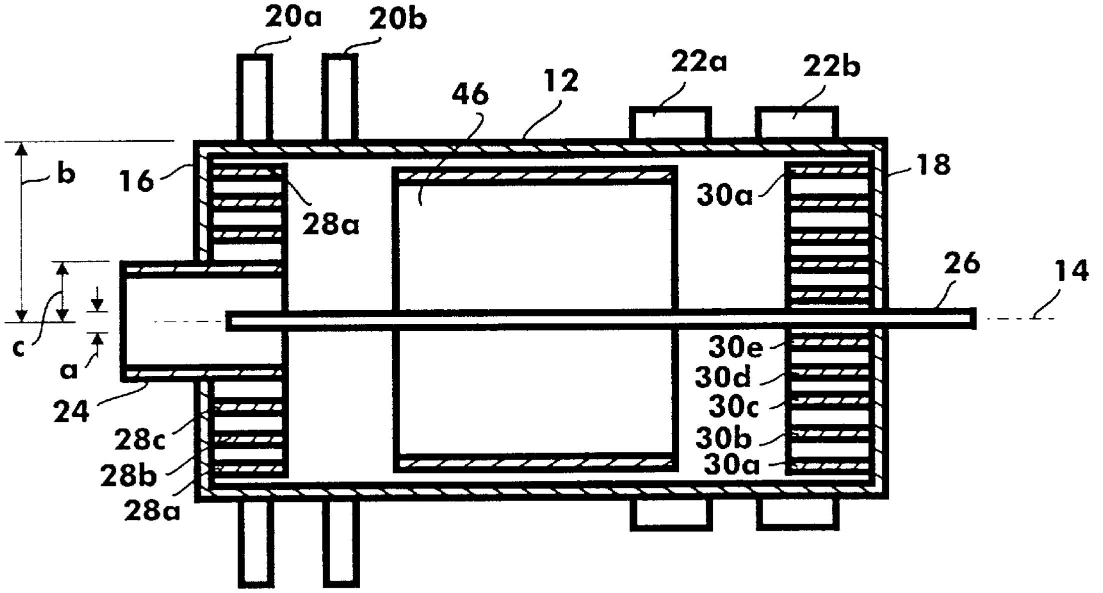
FIG. 2 is a cross sectional view of the vacuum chamber as seen along the line 2—2 in FIG. 1.

Additional features of the device 10 will, perhaps, be best appreciated with reference to FIG. 2. There it will be seen that the device 10 includes a substantially rod-shaped, metallic electrode 26 that extends along the longitudinal axis 14 through the center of the chamber 12. For purposes of the present invention, this centrally located electrode 26 will preferably include two elements. One of the elements is preferably a light metal that has a mass "$m_1$". As envisioned for the present invention, the second element of the central electrode 26 will be a relatively heavy impurity having a mass "$m_2$."

FIG. 2 also shows that a plurality of ring electrodes 28 are positioned in a plane around the longitudinal axis 14 at the first end 16. The electrodes 28*a,* 28*b* and 28*c* are only exemplary. FIG. 2 also shows that there are a plurality of ring electrodes 30 which are positioned in a plane around the longitudinal axis 14 at the second end 18. Again, the electrodes 30*a,* 30*b,* 30*c,* 30*d* and 30*e* are only exemplary. Together, the central electrode 26 and the ring electrodes 28 and 30 create an electric field inside the chamber 12 that will vary radially from the longitudinal axis 14 to provide a desirable radial distribution as described below. Recall, "e" is the ion charge, "m" is the mass of an ion, and "r" is a radial distance from the longitudinal axis 14. For the device 10, wherein "a" is the radius of the central electrode 26, "b" is the radius of the chamber 12, and "c" is the radius of the exit 24 (see FIG. 2), a critical potential $U_o$ can be expressed as $U_o=e^2B^2(b^2-a^2)^2/8a^2m$.

Figure 3:
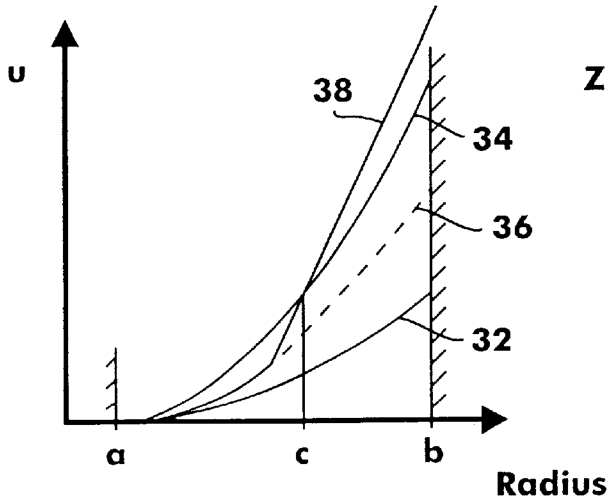
FIG. 3 is a graph showing the variation in electrical potential inside the chamber as a function of distance in a radial direction from the central electrode.

Desirable radial profiles 34 and 38 of the electric potential are shown in FIG. 3. For the purpose of explanation, several other profiles are also shown. For example, the radial profile 32 shown in FIG. 3 is representative of the cut-off potential for an ion of heavy mass, $m_2$. The radial profile 34, on the other hand, is representative of the cut-off potential for an ion of light mass, $m_1$. Stated differently, with a radial profile 32 for the electrical potential, U(r), in the chamber 12, the ions of mass $m_2$ will be directed back toward the axis 14 for collision with the central electrode 26. The ions of light mass $m_1$, however, will not be so directed. Further, with a radial profile 34 for the electrical potential, U(r), in the chamber 12, both the ions of mass $m_1$ and mass $m_2$ will be directed into collision with the central electrode 26. Thus, operationally, in order to separate the ions of mass $m_1$ from the ions of mass $m_2$, the device 10 is preferably operated with a radial profile 36 that is somewhere between the radial profiles 32 and 34. In some instances, as explained more fully below, it may be necessary or desirable to operate with a radial profile 38.

Figure 4:
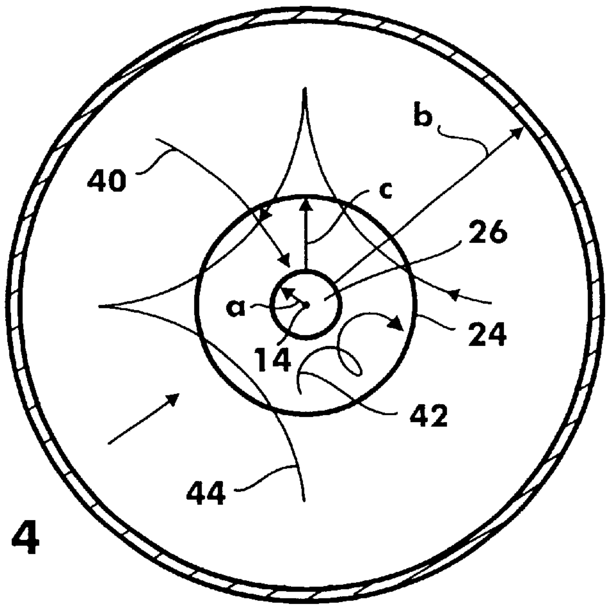
FIG. 4 is a cross sectional view of the vacuum chamber as seen along the line 4—4 in FIG. 1 with portions removed for clarity.

With a radial profile 36 in the chamber 12, the heavier ions of mass $m_2$ will generally follow a path similar to the trajectory 40 shown in FIG. 4. Thus, the heavier ions ($m_2$) will be accelerated back into collision with the central electrode 26. The result of this is additional sputtering of the central electrode 26. At the same time, because the radial profile 36 is below the cut-off potential for the lighter ions of mass $m_1$ (i.e. radial profile 34), the lighter ions ($m_1$) will be confined within the chamber 12. In FIG. 4, the trajectory 42 is exemplary of a cold light ion and the trajectory 44 is exemplary of a hot light ion. In both instances, the trajectories 42 and 44 indicate that the ion does not collide with the central electrode 26. Stated differently, the ions on trajectories 42 and 44 are confined in the chamber 12.

Inside the chamber 12, the sputtered particles of heavier mass $m_2$ can either be ionized and return to the central electrode under the influence of the electric field, or, as neutrals, reach a collector 46. As seen in FIG. 2, the collector 46 is preferably a cylindrical-shaped plate that is located near the wall of the chamber 12, at a distance from the central electrode 26. The lighter ions of mass $m_1$, which are confined within the chamber 12, will be expelled from the chamber 12 through the exit 24. This can be caused to happen by properly configuring the magnetic field (B) inside the chamber 12.

Figure 5:
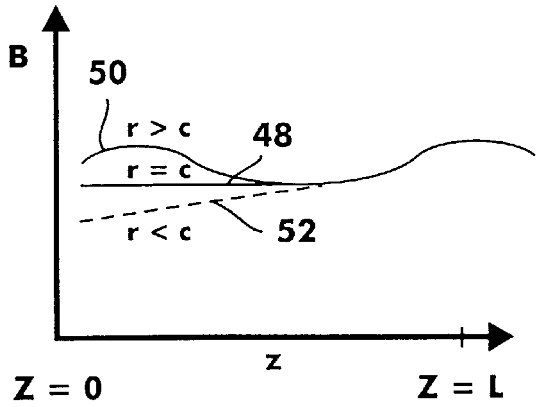
FIG. 5 is a graph showing the variation in magnetic field strength inside the chamber, in an axial direction through the chamber.

In accordance with the present invention, the configuration of the magnetic field (B) inside the chamber 12 can, perhaps, be best appreciated by reference to FIG. 5. In FIG. 5, consider that the axial position Z=0 is at the first end 16 of the chamber 12, and that "z" increases along the longitudinal axis 14 in a direction from the first end 16 to the second end 18. The axial profiles 48, 50 and 52 are illustrative of magnetic field strengths for B inside the chamber 12. Recall, the device 10 incorporates respective magnetic mirrors at the first end 16 and the second end 18 of the chamber 12. Specifically, due to the configuration of the magnetic coils 20*a* and 20*b* at the first end 16 of the chamber 12 (i.e. where z=0), the field strength B will vary as shown. At the exit 24, where $r<c$, where c is the radius of the exit 24, the magnetic field B will have the axial profile 52. At the $r>c$, the magnetic field B will have the axial profile 52. Thus, there is a diverging magnetic field at $r<c$ which effectively creates an annular shaped magnetic mirror at the first end 16. On the other hand, due to the magnetic coils 22*a* and 22*b* at the second end 18 of the chamber 12 (i.e. where z=L), the field strength will be relatively high over the entire second end 18. The consequence here is that the magnetic mirror at the second end 18 will tend to redirect charged particles away from the second end 18 and toward the first end 16. The annular-shaped magnetic mirror at the first end 16 will, however, allow the charge particles to exit from the chamber 12 through the exit 24.

In operation, the magnetic field, B, is established as described above. A vacuum of around $10^{-4}$ Torr is drawn inside the chamber 12 and a gas, such as hydrogen ($H_2$) or Argon (Ar) is introduced into the chamber 12. The electric field, E, is then activated to initiate a plasma discharge in the chamber 12. Specifically, the electric field, E, is established with a potential that will effectively accelerate ions in the chamber 12 to an energy in the range of one to three thousand electron volts (1–3 KeV). The resultant sputtering of the central electrode 26 will then cause both light ions ($M_1$) and heavy ions ($m_2$) to be present in the chamber 12. With an electric field having a radial profile (e.g. radial profile 36) the heavier ions ($m_2$) will be directed toward the central electrode 26 for further sputtering. The lighter ions ($m_1$) will be confined inside the chamber 12 and eventually expelled through the exit 24 by the effect of the magnetic mirrors disclosed above. Heavier neutrals with mass $m_2$ that reach the outer wall without ionization shall be collected on the collector 46.

It is to be appreciated that the operation disclosed above will be effective so long as there is a sufficient amount of the heavier ions of mass $m_2$. If the central electrode 26 contains only a minority of an impurity (i.e. the ions of mass $m_2$ are less than 10–30% of the electrode 26), it may be necessary to adjust the electric field. Specifically, for this case, the ring electrodes 28 and 30 can be adjusted so that the radial profile 38 is established inside the chamber 12. With this potential, a fraction of the light ions that reach the plasma periphery will be directed by the electric field back to the central electrode to take part in further sputtering. Subsequently, as the proportion of heavier ions in the electrode 26 is increased, it will be possible to establish the radial profile 36 inside the chamber 12.

While the particular Mass Filtering Sputtered Ion Source as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for separating ions which comprises:

an elongated chamber defining a longitudinal axis and having a first end and a second end;

a central electrode positioned in said chamber and oriented along said axis, said electrode including a first element and a second element;

a means for generating an axially oriented magnetic field, B, in said chamber, said magnetic field having a substantially full magnetic mirror centered on said axis and perpendicular thereto at said first end of said chamber, and a substantially annular-shaped magnetic mirror centered on said axis and perpendicular thereto at said second end of said chamber; and a means for generating a radially oriented electric field, E, in said chamber to create ions of said first and second elements as said first and second elements are sputtered from said central electrode, said electric field being configured to confine ions of said first element for exit from said chamber through said annular-shaped magnetic mirror, and to direct ions of said second element into contact with said central electrode for sputtering thereof.

2. A device as recited in claim 1 wherein said first elements have a relatively light mass, $m_1$, and said second elements have a relatively heavy mass, $m_2$.

3. A device as recited in claim 2 wherein said electric filed, E, is configured with a critical electric potential $U(r)=e^2B^2(r^2-a^2)^2/8a^2m=U_o(r^2-a^2)^2/(b^2-a^2)^2$, where $U_o=e^2B^2(b^2-a^2)^2/8a^2m$, "e" is the ion charge, "r" is a radical distance from the axis, "a" is the diameter of a cylindrical shaped said central electrode, "b" is the diameter of said elongated chamber, and "m" is the mass of an ion.

4. A device as recited in claim 2 wherein said first element is a light metal and said second element is an impurity.

5. A device as recited in claim 1 further comprising a means for pre-filling said chamber with a gas, said electric field generating means interacting with said gas to generate a plasma discharge in said chamber for initiating a sputtering of said central electrode.

6. A device as recited in claim 1 wherein said electric field, E, has a magnitude for accelerating ions in said chamber to an energy in the range of one to three thousand electron volts (1–3 KeV).

7. A device as recited in claim 1 wherein said electric field, E, is directed radially toward said axis.

8. A device as recited in claim 1 wherein said means for generating said axially oriented magnetic field, B, is a plurality of magnetic coils mounted on said chamber.

9. A device as recited in claim 1 wherein said means for generating said radially oriented electric field, E, is a first plurality of cylindrical shaped electrodes positioned at said first end of said chamber, and a second plurality of cylindrical shaped electrodes positioned at said second end of said chamber.

10. A device for separating ions which comprises:

a vacuum chamber for containing neutral atoms of a first element having a relatively light mass, $m_1$, and neutral atoms of a second element having a relatively heavy mass, $m_2$, said chamber having a first end and a second end;

an electric means, including a rod-shaped electrode positioned in said chamber for creating ions of said neutral atoms, said electric means generating an electric field, E, configured to force ions of said second element into collision with said electrode to sputter additional neutral atoms therefrom and to confine ions of said first element in said chamber for subsequent removal from said chamber; and a magnetic means for generating a magnetic field, B, to direct ions of said first element for exit from said chamber through said second end.

11. A device as recited in claim 10 wherein said chamber is elongated and defines a longitudinal axis extending between said first end and said second end, and wherein said rod-shaped electrode is oriented along said axis.

12. A device as recited in claim 11 wherein said magnetic field has a substantially full magnetic mirror centered on said axis and perpendicular thereto at said first end of said chamber, and a substantially annular-shaped magnetic mirror centered on said axis and perpendicular thereto at said second end of said chamber, said annular-shaped magnetic mirror having an opening positioned on said axis for exit of ions from said chamber therethrough.

13. A device as recited in claim 11 wherein said electric filed, E, is directed radially toward said axis and is configured with a critical electric potential $U(r)=e^2B^2(r^2-a^2)^2/8a^2m=U_o(r^2-a^2)^2/(b^2-a^2)^2$, where $U_o=e^2B^2(b^2-a^2)^2/8a^2m$, "e" is the ion charge, "r" is a radial distance from the axis, "a" is the diameter of a cylindrical shaped said central electrode, "b" is the diameter of said elongated chamber, and "m" is the mass of an ion.

14. A device as recited in claim 10 further comprising a means for pre-filling said chamber with a gas having neutral atoms therein, said electric field, E, interacting with said neutral atoms of said gas to generate a plasma discharge in said chamber for initiating a sputtering of said central electrode.

15. A device as recited in claim 10 wherein said electric field, E, has a magnitude for accelerating ions in said chamber to an energy in the range of one to three thousand electron volts (1–3 KeV).

16. A device as recited in claim 10 wherein said magnetic means includes a plurality of magnetic coils mounted on said chamber for generating an axially oriented said magnetic field, B.

17. A device as recited in claim 10 wherein said electric means includes a first plurality of cylindrical shaped electrodes positioned at said first end of said chamber, and a second plurality of cylindrical shaped electrodes positioned at said second end of said chamber for generating a radially oriented said electric field, E.

18. A method for separating ions which comprises the steps of:

containing neutral atoms of a first element having a relatively light mass, $m_1$, and neutral atoms of a second element having a relatively heavy mass, $m_2$, in a vacuum chamber defining a longitudinal axis and having a first end and a second end;

positioning a central electrode in said chamber, said central electrode being oriented along said axis, and said electrode including a first element and a second element;

generating an axially oriented magnetic field, B, in said chamber, said magnetic field having a substantially full magnetic mirror centered on said axis and perpendicular thereto at said first end of said chamber, and a substantially annular-shaped magnetic mirror centered on said axis and perpendicular thereto at said second end of said chamber; and generating a radially oriented electric field, E, in said chamber to create ions of said first and second elements as said first and second elements are sputtered from said central electrode, said electric field being configured to confine ions of said first element for exit from said chamber through said annular-shaped magnetic mirror, and to direct ions of said second element into contact with said central electrode for sputtering thereof.

19. A method as recited in claim 18 wherein said electric filed, E, is directed radially toward said axis and is configured with a critical electric potential $U(r)=e^2B^2(r^2-a^2)^2/8a^2m=U_o(r^2-a^2)^2/(b^2-a^2)^2$, where $U_o=e^2B^2(b^2-a^2)^2/8a^2m$, "e" is the ion charge, "r" is a radial distance from the axis, "a" is the diameter of a cylindrical shaped said central electrode, "b" is the diameter of said elongated chamber, and "m" is the mass of an ion.

20. A method as recited in claim 18 further comprising the steps of:

pre-filling said chamber with a gas; and interacting said electric field with said gas to generate a plasma discharge in said chamber to initiate a sputtering of said central electrode.

* * * * *

UNITED STATES PATENT AND TRADEMARK OFFICE

CERTIFICATE OF CORRECTION

PATENT NO. : 6,326,627 B1
DATED : December 4, 2001
INVENTOR(S) : Sergei Putvinski and Vadim Volosov It is certified that error appears in the above-identified patent and that said Letters Patent is hereby corrected as shown below:

Column 2,
Line 10, delete

" $m(V_r^2 + V_\theta^2 + V_z^2)/2 + e\phi+(r) = \varepsilon$ "

insert

-- $m(V_r^2 + V_\theta^2 + V_z^2)/2 + e\phi(r) = \varepsilon$ --

Line 10, delete "$\theta$" insert -- "$\phi$" --

Column 7,
Line 51, delete "radical" insert -- radial --

Signed and Sealed this

Eleventh Day of June, 2002

*Attest:*

JAMES E. ROGAN

*Attesting Officer* *Director of the United States Patent and Trademark Office*